United States Patent
Maumus et al.

[11] Patent Number: 5,996,676
[45] Date of Patent: Dec. 7, 1999

[54] TOOLING USING THERMOSTRUCTURAL COMPOSITE MATERIALS CONTAINING CARBON FOR HEAT TREATMENT AND/OR THERMOCHEMICAL TREATMENT INSTALLATIONS

[75] Inventors: Jean-Pierre Maumus, Cenon; Jacques Thebault, Bordeaux, both of France

[73] Assignee: Societe Nationale d'Etude et de Construction de Moteurs d'Aviation, Paris, France

[21] Appl. No.: 08/732,274
[22] PCT Filed: Mar. 8, 1996
[86] PCT No.: PCT/FR96/00373
  § 371 Date: Oct. 29, 1996
  § 102(e) Date: Oct. 29, 1996
[87] PCT Pub. No.: WO96/27570
  PCT Pub. Date: Sep. 21, 1996

[30] Foreign Application Priority Data

Mar. 8, 1995 [FR] France ................................ 95 02697

[51] Int. Cl.$^6$ ..................................... B22D 19/02
[52] U.S. Cl. ........................... 164/75; 164/106; 428/545; 428/68
[58] Field of Search ..................... 428/545, 615, 428/621, 68; 164/75, 106

[56] References Cited

FOREIGN PATENT DOCUMENTS 0269480  6/1988  European Pat. Off. .

OTHER PUBLICATIONS

Chemical Abstracts, vol. 114, No. 12, Mar. 25, 1991, Columbus, Ohio, Abstract No. 107765, Nakamoto Takashi & Al, "Cast Encapsulated Ceramics Thermal Insulators and Their Manufacture", and JP–A–02 180 763, Jul. 13, 1990.
Database WPI Section Ch, Week 8524, Derwent Publications Ltd., London, G.B., Class A82, AN 85–144586 and JP–A60 079 945 (Daido Tokushuko KK), May 7, 1985.
Database WPI Section Ch, Week 8435, Derwent Publications Ltd., London G.B., Class L02, AN 84–217078 and JP–59 128 282 (Aisin Seiki KK), Jul. 24, 1984.
Database WPI Section Ch, Week 8735, Derwent Publications Ltd., London G.B., Class L02, an 87–248023 and JP–A62 171 969 (Toshiba KK), Jul. 28, 1987.
The English translation of JP59–128282, Jul. 1984.
The English translation of JP2–180763, Jul. 1990.

*Primary Examiner*—Jenna Davis
*Attorney, Agent, or Firm*—Weingarten, Schurgin, Gagnebin & Hayes LLP

[57] ABSTRACT

An interposition layer (12) is formed on the outside surface of a part (10) made of thermostructural composite material containing carbon, and a metal case is formed by casting molten metal (22) around the part provided with its interposition layer. The interposition layer has closed porosity and it is proof against the metal of the case, such that shrinkage of the metal during cooling is absorbed by compacting or collapsing the porosity of the interposition layer, thereby preserving the integrity of the metal case, and the interposition layer constitutes a diffusion barrier preventing eutetics forming by contact between the metal of the case and the composite material.

10 Claims, 1 Drawing Sheet

TOOLING USING THERMOSTRUCTURAL COMPOSITE MATERIALS CONTAINING CARBON FOR HEAT TREATMENT AND/OR THERMOCHEMICAL TREATMENT INSTALLATIONS

BACKGROUND OF THE INVENTION

The present invention relates to tooling using thermostructural composite materials containing carbon for installations for performing heat treatment and/or thermochemical treatment. The term "tooling" is used herein to cover those elements which serve to support other elements that are to be treated in such installations, in particular oven sole-plates, loading trays, legs and spacers for holding trays at different levels, etc.

Thermostructural composite materials are characterized by their mechanical properties that make them suitable for constituting structural elements, and by their ability to retain these properties at high temperatures. They have various uses, in particular as fairing elements for space vehicles, friction disks, in particular aircraft brake disks, parts for thruster nozzles, parts for turbojets, or indeed tooling for ovens in which treatments are performed at high temperature. Examples of thermostructural composite materials are materials comprising a preform, i.e. fiber reinforcement made of refractory fibers (carbon or ceramic fibers) densified by a matrix that is likewise refractory (carbon or ceramic), such as carbon—carbon composite materials (C—C, for carbon fiber reinforcement and a carbon matrix), or ceramic matrix composite materials (CMCs).

The use of thermostructural composite materials, and more particularly of C—C composite materials for tooling that is intended for heat treatment installations is described, in particular, in document FR-A-2 677 740.

Compared with metal tooling, such C—C composite tooling has the advantages of characteristics that do not deteriorate at high temperatures, and in particular, while at such temperatures, they are not subject to brittleness, creep, or deformation, and in addition they are of substantially lower mass, thereby providing an excellent ratio between the weight of the parts treated and the weight of the tooling.

Nevertheless, in addition to their relatively high cost, C—C composite materials, and more generally thermostructural composite materials containing carbon, can give rise to problems in certain applications.

They have a surface state characterized by a degree of roughness and conserved residual pores however much care is taken when densifying the fiber reinforcement with the matrix. Also, C—C composites are sensitive to corrosion by oxidation in air at temperatures above 450° C. This sensitivity to oxidation also exists for CMCs, either because the fiber reinforcement is made of carbon fibers, or else because an interphase layer of pyrolytic carbon is formed between the fibers of the reinforcement and the matrix, in the manner described in particular in document EP-A-0 172 082. Also, when the tooling is used in installations for treating metal elements, the presence of carbon in the thermostructural materials can give rise to undesirable phenomena of the treated elements being carbided.

It is therefore desirable to remedy these drawbacks so as to be able to benefit fully from the advantages offered by thermostructural composite materials, and the solution proposed herein consists in making the tooling in the form of composite material parts provided with metal covering.

The composite part and the metal case could be manufactured separately and then assembled together. However, that technique is not envisagable in practice because of the complexity of assembling the parts and because of the difficulty in controlling the large clearance that inevitably appears at high temperatures between the composite part and its case. Another possibility lies in hot-forming the metal case, e.g. by casting metal around the composite part. In addition to the problem caused by the difference between the coefficients of thermal expansion of the composite part and of the metal case with regard to the necessity to conserve the integrity thereof, contact between metal and composite material containing carbon also suffers from drawbacks. In particular when the metal case is made of steel, eutetics may form with the carbon of the composite part, having the undesirable consequence of degrading the mechanical behavior of the tooling.

Document FR-A-2 676 051 has indeed proposed making a metal covering from a mixture of powders deposited on the surface of a part and subjected to heat treatment, however there still remains the main drawback mentioned above of methods in which the metal case is formed hot.

SUMMARY OF THE INVENTION

The present invention seeks to remedy these difficulties by providing a method making it possible for a part made of thermostructural composite material containing carbon to be covered in a metal case while also controlling any clearance between the part and the case, maintaining the integrity of the metal case in spite of differential dimensional variations of thermal origin, and preventing eutetics forming between the metal of the case and the composite material.

This object is achieved by a method comprising the following steps:

forming over the entire outside surface of the piece of composite material, an interposition layer forming a diffusion barrier and having porosity constituted by empty volumes and/or by pores; and forming a metal case by casting molten metal around the part provided with the interposition layer, with shrinkage of the metal during cooling being absorbed by compacting or collapsing the porosity of the interposition layer, without destroying its diffusion barrier function, thereby preserving the integrity of the metal case while preventing any direct contact between the metal of the case and the composite material.

Various substances can be used for forming at least a portion of the interposition layer. The layer must act as a mold wall while the metal is being cast, it must have porosity capable of collapsing or compacting under the effect of the metal contracting as it cools, without giving rise to traction or compression stresses that are unacceptable for the metal case so that the case conserves its integrity, and the layer must also constitute a diffusion barrier both against case metal diffusing towards the composite material and against carbon diffusing outwards from the material.

Examples of substances that are suitable for the interposition layer are porous refractory materials having closed porosity or loose fiber fabrics of refractory fibers provided with a covering that is proof against the metal of the case.

By way of example, suitable porous refractory materials are friable cements or coatings such as a zirconia cement, optionally filled with hollow microbeads or microballs presenting closed porosity.

Suitable loose fiber fabrics are constituted, for example, by braids, cords, and felts. In order to improve proofing against the metal so as to avoid any infiltration of molten metal into the fiber fabric and so as to constitute a barrier against diffusion of the metal, a metal-proof covering is formed on the fiber fabric. This covering which may optionally have closed porosity, and is constituted, for example, by a material that is sufficiently friable to break under the effect of the metal contracting, but without losing its metal-proof nature.

The invention also relates to tooling as obtained by the above method, i.e. to tooling comprising a part made of thermostructural composite material containing carbon, and characterized in that the part of composite material is provided with a metal case kept separate from the part of composite material by an interposition layer performing the function of a diffusion barrier.

Implementations of the invention are described below by way of non-limiting indication.

DESCRIPTION OF THE DRAWINGS

Reference is made to the accompanying figures, in which.

DETAILED DESCRIPTION OF THE INVENTION

Figure 1:
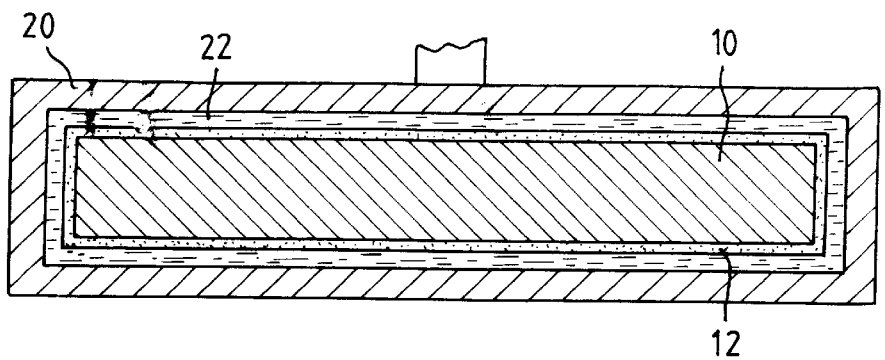
FIG. 1 is a highly diagrammatic section view showing the implementation of a method of the invention for forming a metal case around a part made of composite material.
Figure 2:
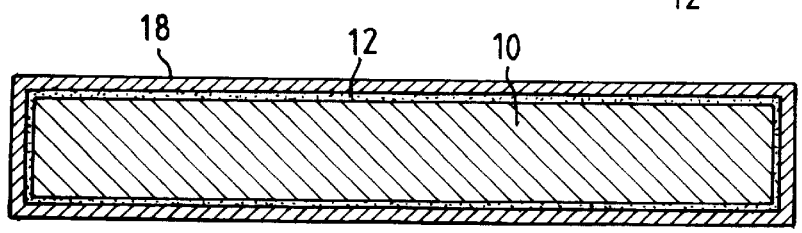
FIG. 2 is a highly diagrammatic section view of the final product obtained by the method of FIG. 1.

FIGS. 1 and 2 show a part 10 made of C—C composite material that is in the form of a plate that is to constitute a tray or a tray element for tooling for loading elements to be treated into an oven for heat treatment or for thermochemical treatment. The term "heat treatment" is used herein to designate treatment at high temperature, typically above 500° C. The term "thermochemical treatment" is used herein to designate treatment at high temperature with the treated substances being modified at least in part by chemical reaction (e.g. carbiding or nitriding).

An interposition layer 12 of friable porous refractory cement having closed porosity is formed over the entire outside surface of the part 10. Examples of porous refractory cements include, in particular, zirconia cements, optionally filled with hollow microbeads or microballs. The thickness of the layer 12 is substantially constant.

The part 10 provided with the interposition layer 12 is placed in a mold 20 (FIG. 1). Molten metal 22, e.g. steel, is cast into the mold around the part 10. After the metal 22 has cooled and solidified, it constitutes a metal case 18 that completely surrounds the part 10 (FIG. 2). During cooling, the metal shrinks and crushes the layer 12, causing its porosity to collapse, while the layer 12 nevertheless retains its function as a barrier against diffusion of the metal of the case 18 and against diffusion of the carbon of the part 10, thereby preventing, for example, the formation of possible eutetics by the metal of the case reacting with the carbon of the composite material.

The degree of porosity and the thickness of the layer 12 are selected in such a manner that the reduction in the volume of said layer under the effect of the metal contracting does not give rise to stresses that could affect the integrity of the composite part 10 or of the metal case 18, while nevertheless allowing a sufficient intermediate layer to subsist for ensuring that the diffusion barrier function is provided. This selection thus makes it possible to control the residual clearance between the composite part and the metal case.

By way of indication, for a cylindrical composite part having a diameter of 18 mm and a length of 600 mm, an interposition layer having a thickness of 0.25 mm, i.e. a layer that is relatively thick, has been made out of zirconia cement having volume porosity of 50% relative to the apparent volume of the porous material.

Figure 3:
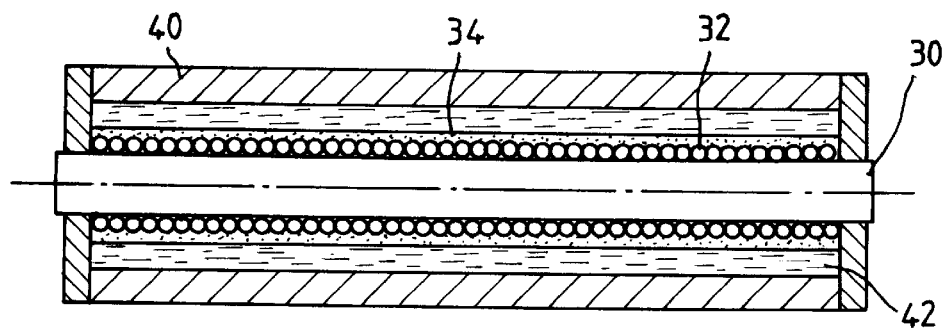
FIG. 3 is a highly diagrammatic section view showing the implementation of another method of the invention for forming a metal case around a part made of composite material.
Figure 4:
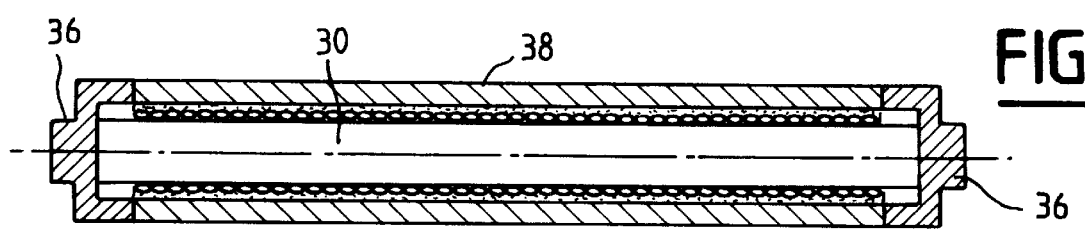
FIG. 4 is a highly diagrammatic section view of the final product obtained by the method of FIG. 3.

Another embodiment of the invention is shown in FIGS. 3 and 4.

The composite material part 30 is a circular section cylindrical bar of C—C composite for constituting a spacer in tooling for loading an oven. The part 30 is provided with an interposition layer in the form of a braid 32 of carbon fibers provided on the outside with a leakproof covering of refractory material 34.

The part 30 provided with the interposition layer is placed in a mold 40 (FIG. 3) into which molten metal 42, e.g. steel, is cast. It should be observed that the mold 40 defines a gap into which metal is cast, the gap extending around the part 30 with the exception of its ends. After the metal 42 has cooled and solidified, it constitutes a metal case 38 surrounding the part 30 (FIG. 4). While it is cooling, the metal shrinks and compresses the braid 32, causing its porosity to be compacted and crushing the covering 34. The covering is advantageously made of a friable material such as a porous refractory cement or coating having closed porosity and of the same type as that used in the embodiment of FIG. 1, that continues to be proof against the metal after being crushed. The refractory layer 34 ensures that the interposition layer is proof against the molten metal. It also protects the braid 32 of carbon fibers from coming into contact with the molten metal and it prevents infiltration of the molten metal into the fiber fabric, which infiltration would have the undesirable effect of filling in its porosity, at least in part. The refractory covering 34 also serves as a barrier against diffusion of the metal towards the carbon, thereby preventing possible formation of eutetics while the tooling element is in use.

The metal case 38 is finished off by metal shields 36 that close the ends of the bar and that are welded to the ends of the case 38.

Figure 5:
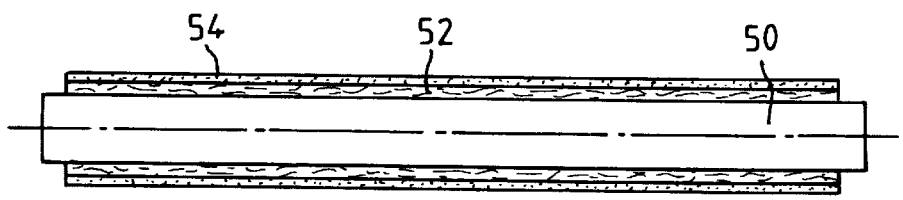
FIGS. 5 and 6 are highly diagrammatic section views showing variant embodiments of the interposition layer for a part made of composite material and intended to be fitted with a metal case by means of a method of the invention.

Fiber fabrics other than braids may be used. Thus, FIG. 5 shows a part 50 in the form of a cylindrical bar provided at its periphery with an interposition layer constituted by a felt 52 having an outer covering 54 of refractory material that is proof against the metal. The felt 52 is made of refractory fibers, e.g. fibers of carbon, of graphite, or of ceramic.

Figure 6:
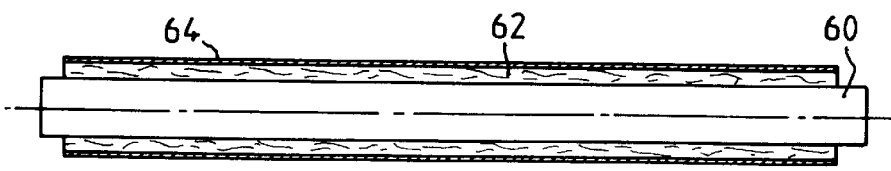

In addition, the covering protecting the fiber fabric and the composite part against the molten metal may be other than a refractory cement or coating. FIG. 6 shows a part 60 provided at its periphery with an interposition layer constituted by a fiber fabric 62 provided on the outside with a covering 64 formed by a metal foil. The covering 64 is of refractory metal, e.g. molybdenum, that is capable of deforming easily under the effect of the case metal shrinking without giving rise to stresses capable of affecting the integrity thereof, and without losing its own integrity so as to continue providing the diffusion barrier function.

We claim:

1. A method of making tooling for installations for heat treatment or thermochemical treatment, the method being characterized in that it comprises the following steps:

providing a piece of thermostructural composite material comprising a fiber reinforcement densified by a matrix, with at least one of said fiber reinforcement, said matrix and an interphase between said fiber reinforcement and said matrix consisting of carbon;

forming over the entire outside surface of said piece of thermostructural composite material containing carbon, an interposition layer forming a diffusion barrier and having porosity constituted by empty volumes or by pores; and forming a metal case by casting molten metal around the piece provided with the interposition layer, with shrinkage of the metal during cooling being absorbed by compacting or collapsing the porosity of the interposition layer, without destroying its diffusion barrier function, thereby preserving the integrity of the metal case while preventing any direct contact between the metal of the case and the composite material.

2. A method according to claim 1, characterized in that the interposition layer is formed at least in part by a porous refractory material having closed porosity comprising pores which are not interconnected.

3. A method according to claim 1, characterized in that the interposition layer is formed at least in part by a fiber fabric made of refractory fibers.

4. A method according to claim 3, characterized in that the fiber fabric is a braid.

5. A method according to claim 3, characterized in that the fiber fabric is a felt.

6. A method according to claim 3, characterized in that an interposition layer is formed that further comprises a refractory covering that serves to protect the composite material part from the metal.

7. A method according to claim 6, characterized in that the refractory covering is made of a friable refractory material.

8. A method according to claim 6, characterized in that the refractory covering is a metal foil.

9. A method according to claim 2, characterized in that the interposition layer is formed at least in part by a fiber fabric made of refractory fibers.

10. A method according to claim 9, characterized in that:
the fiber fabric is selected from the group consisting of a braid and a felt;
an interposition layer is formed that further comprises a refractory covering that serves to protect the composite material part from the metal; and
the refractory covering being selected from the group consisting of a friable refractory material, and a metal foil.

* * * * *

UNITED STATES PATENT AND TRADEMARK OFFICE
CERTIFICATE OF CORRECTION

PATENT NO. : 5,996,676  
DATED : December 7, 1999  
INVENTOR(S) : Jean-Pierre Maumus et al.

Page 1 of 1

It is certified that error appears in the above-identified patent and that said Letters Patent is hereby corrected as shown below:

<u>Title page,</u>
Item [87], "PCT Pub. Date: Sep. 21, 1996" should read -- PCT Pub. Date: Sep 12, 1996 --.

Signed and Sealed this

Fifth Day of March, 2002

*Attest:*

JAMES E. ROGAN
*Attesting Officer*  *Director of the United States Patent and Trademark Office*